United States Patent
Mies

[11] 3,845,702
[45] Nov. 5, 1974

[54] APPARATUS FOR COOKING CHICKEN
[75] Inventor: Carl P. Mies, Louisville, Ky.
[73] Assignee: Mies Filter Products, Incorporated, West Bend, Wis.
[22] Filed: July 17, 1972
[21] Appl. No.: 272,180

Related U.S. Application Data
[62] Division of Ser. No. 24,517, April 1, 1970, abandoned.

[52] U.S. Cl. .................................. 99/408, 210/162
[51] Int. Cl. ........................................... A47j 37/12
[58] Field of Search ............ 99/408, 403, 404, 405, 99/406, 407, 107; 210/159, 162

[56] References Cited
UNITED STATES PATENTS

| | | | |
|---|---|---|---|
| 1,707,786 | 4/1929 | Ehrhart | 99/406 |
| 2,128,738 | 8/1938 | Blake | 99/403 U |
| 2,914,063 | 11/1959 | Wagner | 99/403 U |
| 3,194,662 | 7/1965 | Nelson | 99/403 U |
| 3,263,596 | 8/1966 | Thomas | 99/408 |
| 3,363,541 | 1/1968 | Anetsberger | 99/408 |
| 3,655,411 | 4/1972 | Albright | 99/407 X |

Primary Examiner—Harvey C. Hornsby
Assistant Examiner—Arthur O. Henderson
Attorney, Agent, or Firm—Mann, Brown, McWilliams & Bradway

[57] ABSTRACT

The disclosure pertains to a deep fat fryer and a method of cooking chicken using same in which the chicken and cooking oil are employed in a ratio on the order of one to two, respectively, as to weight, and are placed in a smooth walled generally cylindrical chamber of the fryer with the fryer being provided with band type electric heaters adjacent to but spaced from the lower end of the chamber and outside of same to provide hot side wall heat input. The chicken to be cooked is in dry breaded serving piece form, and at a temperature of about 45° F. It is cooked within a basket removably positioned in the chamber that seats on the chamber bottom above a special filter unit that also seats on the chamber bottom above a drain outlet and in a relatively cool area of the chamber. After the fat has been heated to approximately 400° F., the chicken is dropped in the fat and within the basket, lifted gently within the fat to separate the pieces, and allowed to brown until it has approximately a cornflake color, after which the chamber is closed for cooking under pressure conditions on the order of 14 to 15 psig. When the vessel is up to pressure, the current to the vessel heaters is turned off and 9 minutes after the vessel is closed, the chicken is removed to a holding oven. The fat is then reheated to the 400° F. temperature level for cooking the next batch in like manner. After approximately six batches the cooking oil is drained under pressure through the filter unit and is reapplied to the vessel with sufficient make up cooking oil to restore the original cooking oil amount for cooking like batches of chicken in like manner.

4 Claims, 3 Drawing Figures

INVENTOR
CARL P. MIES

3,845,702

APPARATUS FOR COOKING CHICKEN

This application is a division of my abandoned application Ser. No. 24,517, filed Apr. 1, 1970.

This application is closely related to the copending application of Carl P. Mies and Winston L. Shelton, Ser. No. 824,430, filed May 14, 1969, now U.S. Pat. No. 3,610,133 and discloses some of the features of said copending application that are present in the applicant's invention, as well as improvements relating to same.

This invention relates to a apparatus for cooking chicken, and more particularly, to a apparatus for deep fat frying chicken in serving piece form.

Cookers for deep fat frying of chicken and the like on a mass basis have developed into comparatively complex mechanisms requiring careful operation by trained personnel for best results as well as personal safety. Furthermore, cooking oil requirements have proved to be a significant problem from cost and handling standpoints in terms of solids removal and oil replacement in the furtherance of efforts to provide a consistently good product that avoids digestive problems.

A principal object of this invention is to provide a apparatus for cooking chicken which not only provides a consistently good product under low pressure conditions, but which also provides multiple use of the same cooking oil change without adversely affecting quality.

Another principal object of the invention is to provide a deep fat fryer that is safe and easy to operate by unskilled help, and that reduces chicken cookery on a mass basis to a few simple steps which will consistently provide a high quality product that has a significantly improved shelf life.

Other objects of the invention are to provide a method of cooking chicken in serving piece form in which the chicken is cooked under controlled conditions of pressure and temperature that keep the surface temperature of the chicken substantially uniform and no more than about 250° F., in which the prssure is generated from moisture within the chicken even though the end product is significantly improved in moisture content, in which a built in safety factor is involved which eliminates the possibility of overcooking, and in which the "warmer" may be worked to rather than having to work on a "cook to order" basis.

Still another object of the invention is to provide a deep fat fryer that is economical of manufacture, convenient and efficient in use, and long lived in operation.

In accordance with this invention, deep fat frying of the chicken is done on the basis of one pound of chicken to about two pounds of cooking oil or fat, with the oil being first preheated to about 400° F. under atmospheric conditions, during the course of which the heat is turned off, the chicken in dry breaded serving piece form and at a temperature of about 45° F. then being deposited in the fryer, stirred briefly, and cooked with the cover open until it is browned to a cornflake color, whereupon the fryer is sealed for pressure cooking at pressures on the order of 14 – 15 psig. As soon as the fryer gets up to pressure, the power source to the electrical heater is cut off so that the pressure cooking is done under retained heat conditions, until a lapse of about nine minutes from the closure of the pot, during which period the temperature of the cooking oil drops to about 250° F. The resulting high quality product is removed from the cooking chamber for serving or temporary storage, and another batch of chicken may be applied to the fryer in the same cooking oil, whereupon the cooking procedure is repeated. After about six batches, the cooking oil is drained through a special filter unit under pressure, which removes substantially all of the solids from the cooking oil, and then is reapplied to the fryer together with sufficient make-up cooking oil to restore the cooking oil to its original volume. Additional batches are prepared in like manner using the same cooking oil or fat charg, cleaned and replenished as indicated, until the charge of cooking oil has broken down, whereupon a new cooking oil charge is started.

The method of this disclosure employs several significant departures from commonly known procedures, such as those described in Sanders U.S. Pat. No. 3,245,800. I employ conditions of temperature, pressure and chicken and cooking oil weights and volumes that provide for cooking of the chicken by maintaining the heat intensity on same substantially uniform and at a temperature level that cooks without driving off excessive moisture from the chicken while yet relying on the moisture in the chicken to bring the fryer up to pressure, that have a built in safety factor against over cooking, and that permit the pressure cooking stages of the method to be affected using retained heat in the cooker, rather than requiring a continual supply of heat.

Other objects, uses, and advantages will be obvious or become apparent from a consideration of the following detailed description and the application drawings in which like reference numerals indicate like parts throughout the several views.

However, it is to be understood that the specific drawing illustrations provided are supplied primarily to comply with the requirements of the Patent Code, and that the invention may have other specific embodiments that will be obvious to those skilled in the art and that are intended to be covered by the appended claims.

GENERAL DESCRIPTION

Figure 1:
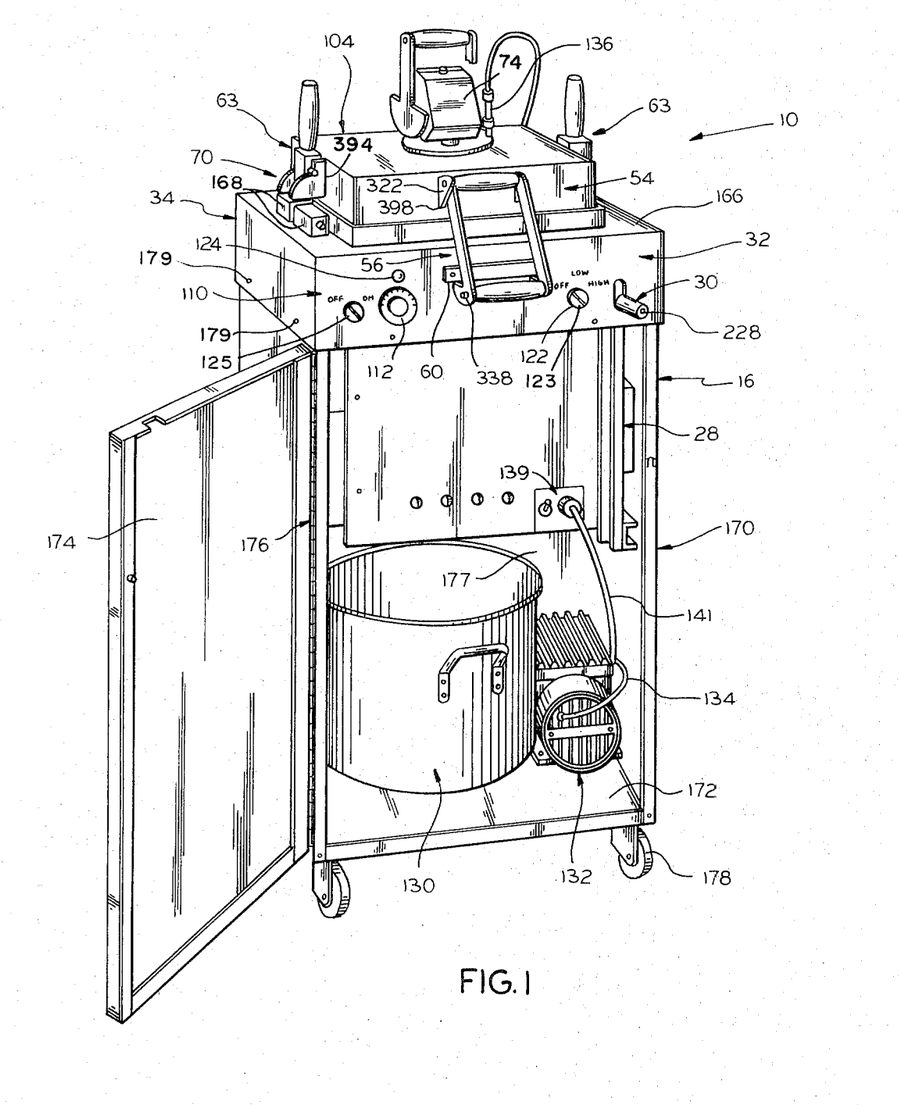
FIG. 1 is a perspective view of one embodiment of the fryer showing the interior of the cabinet of which the cooker of the illustrated embodiment forms a part, and several pieces of associated equipment that are involved in same.
Figure 2:
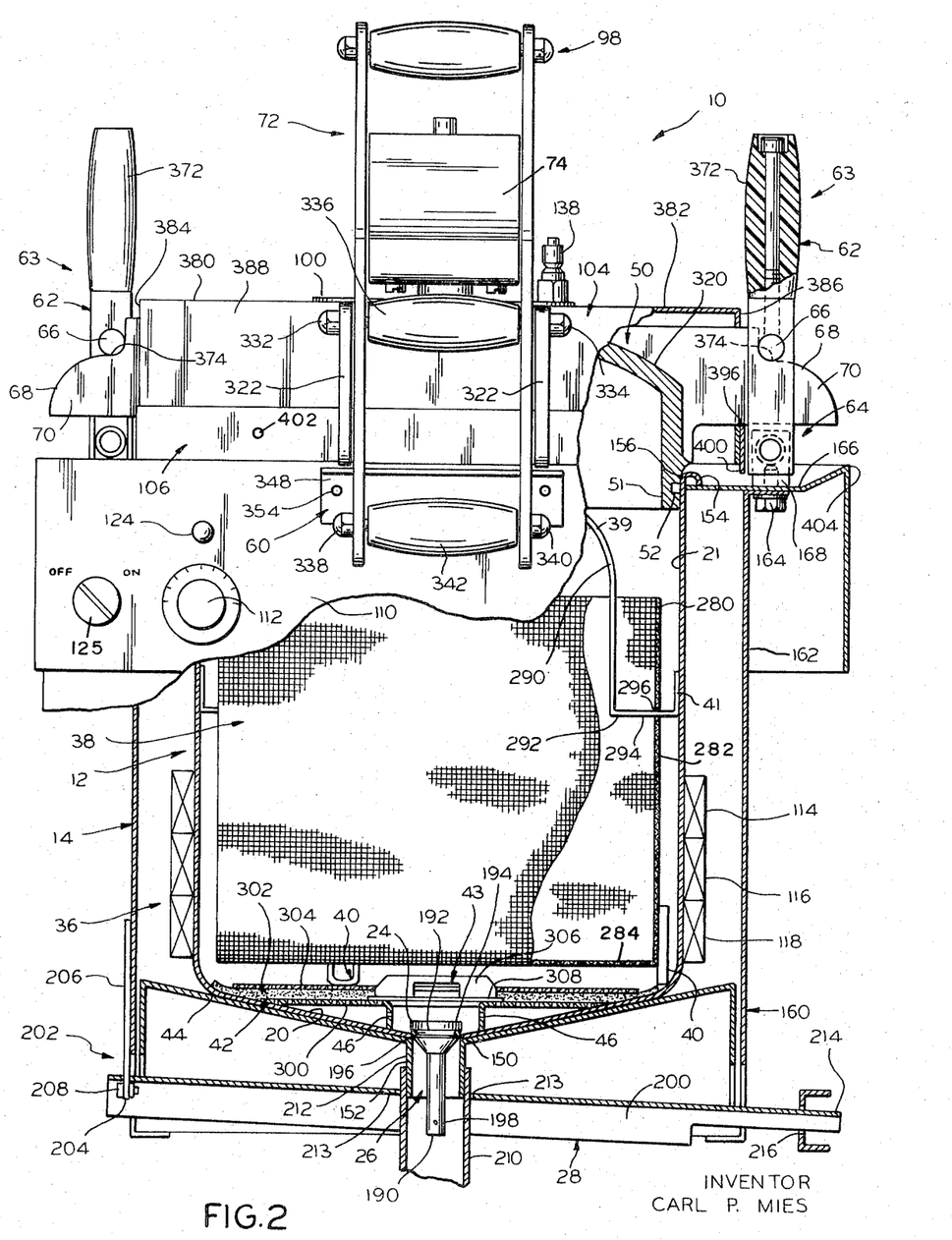
FIG. 2 is a front elevational view of the upper portion of the fryer, with parts being broken away to expose other parts.
Figure 3:
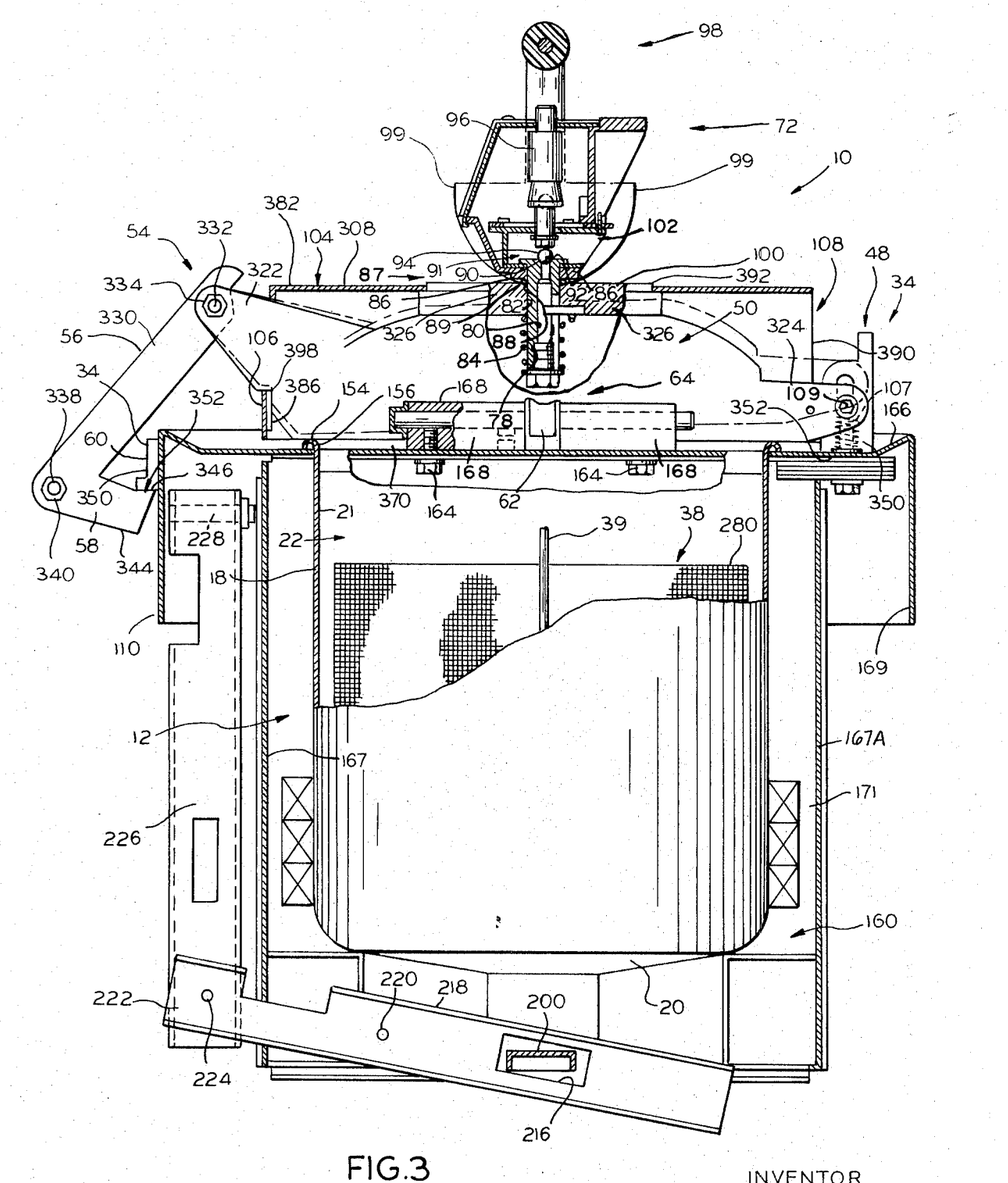
FIG. 3 is a side elevational view of the upper portion of the fryer, with parts being shown in section and other parts being broken away to expose interior components.

Reference numeral 10 of FIGS. 1 – 3 generally indicates a commercialized embodiment of the invention which comprises a vessel 12 (see FIGS. 2 and 3) mounted in a suitable housing and supporting structure 14 that is incorporated in a suitable cabinet 16 which houses the vessel 12 and its associated components.

The vessel 12 is generally cylindrical in configuration and comprises a cylindrical side wall 18 merging into a frustoconical bottom wall 20, which together define a smooth walled cooking or frying compartment 22 that is free of any and all protuberances, recesses, and the like that could form a trap or lodge place for solids.

The bottom wall 20 of the vessel defines an outlet 24 (see FIG. 2) for draining cooking oil therefrom, fluid flow through which is controlled by a valve device 26 that is raised and lowered through operating linkage 28 that is in turn controlled by a handle 30 at the front side 32 of the fryer 10, as distinguished from its rear side 34 (see FIGS. 1 and 3).

The vessel 12 is heated by heater device 36 (see FIGS. 2 and 3), and chicken to be cooked is placed in dry bread serving piece form within the vessel 12 in a basket structure 38 that includes legs 40 for supporting same on the bottom of the vessel 12 and a handle 39 for manipulating the basket, which handle 39 in accordance with this invention is arranged to have extensible and retractable end portions 41 (compare FIG. 2). Interposed between the basket 38 and the bottom wall 20 of the vessel 12 is a filter device 42 that rests on the vessel bottom wall 20 at its rim 44 and engages the vessel bottom wall 20 adjacent drain outlet 24 through legs or projections 46. The front panel 167, rear panel 169 and side panels 162 of housing structure 14 define a space 171 about vessel 12 that is suitably lined with a suitable insulating material such as fiber glass to keep the heat generated by heater device 36 concentracted in vessel 12, and make for a cooler work area adjacent fryer 10. In one form of the invention fiber glass sheeting is stuffed into space 171 to completely fill it, and the vessel 12 is formed from stainless steel.

Pivotally connected to the housing structure 14 by special hinge structure 48 (see FIG. 3) is a cover 50 that includes about its rim 51 a seal 52 (see FIG. 2) proportioned for sealing engagement with the internal wall surface 21 of vessel 12 in the closed position of the cover 50. Associated with the cover 50 is a catch device 54 at the front 32 of the fryer 10 comprising a swing arm structure 56 formed with catch shoulders 58 to cooperate with a catch element 60 fixed to housing structure 14.

On either side of the cover 50 are cam locks 63 comprising hold down swing arms 62 pivotally connected as at 64 to the housing structure 14 and carrying rollers 66 for camming cooperation with cam surfaces 68 of the spaced flanges 70 that are formed on either side of the cover 50.

The cover 50 carries a novel pressure regulator unit 72 which controls the maximum pressure that can be generated within the vessel 12 during the frying operation.

The filter unit 42 generally comprises a perforated filter plate 300 provided with the handle structure 43, a sheet of filter paper 302 of any appropriate type, and a perforated protector plate 304.

The members 300 and 304 may be formed of any suitable perforated metallic material, and handle structure 43 generally comprises a suitable handle member 306 affixed to a suitable base plate 308, as by welding, which in turn is suitably affixed to filter plate 300 in any suitable manner as by spot welding.

The pressure regulator unit 72 is a modification of that which is fully disclosed in Winston L. Shelton application Ser. No. 824,431, filed May 14, 1969 now U.S. Pat. No. 3,590,871 (which is owned by the assignee of the instant application). It generally comprises a valve body structure 74 mounted on a stem 78 that is formed with a central passage 80, and that is slidably mounted within opening 82 formed in the cover 50 such that compression spring 84 that biases the stem inwardly of the cover will seat annular seat 86 of valve body 74 against O-ring seal 88 that is received about stem 78, which seal 88 is in turn seated against annular seat 89 that is formed in cover 50 to form a relief valve 87. The passage 80 of stem 78 terminates in an outlet port 90 defining a seat 92 on which is positioned a ball member 94 that serves to close off port 90 under the bias of weight 96. Spring 84 is given a strength such that pressures on the order of 17 psi within vessel 12 (above atmospheric pressure) will move the stem 78 upwardly of FIG. 3 to expose the stem passage 80 to the atmosphere, while the weight 96 has a weight such that ball 94 will be lifted from its sealing relation with seat 92 when pressures within vessel 12 are on the order of 14 – 15 psig, preferably 14.5 psig. Stem seat 92, ball 94 and weight 96 form a valve device that is generally indicated at 91, which valve device is opened as part of the cooking process by the pressure build up in the fryer after it is sealed with the chicken being cooked within same.

Regulator 72 includes swing or rocker arm device 98 that is pivotally connected to the valve body 74 and is provided with cam surfaces 99 forwardly and rearwardly of the regulator that are formed to cooperate with the top surface 100 of cover 50 to permit the operator to manually lift the stem 78 sufficiently to expose its passage 80 to the atmosphere for manually venting the vessel 12 through valve 87.

The valve body structure 74 is formed as indicated at 102 to direct all fluid pressure discharged from the vessel through the valve 91 rearwardly of the cabinet 16, and thus away from the position where the operator would normally stand.

Associated with the cover 50 is a splash shield structure 104 that is anchored to the cover by a yoke 106 and is formed to define at the rear of the cabinet 16 a discharge opening 108 (see FIG. 3) from which fluids under pressure are discharged away from the operator in the event that seal 52 should fail or cam lock devices 63 were actuated to release the cover 50 prematurely.

The hinge structure 48 includes a lost motion arrangement upwardly of the vessel 22 such that when the cam lock devices 63 are moved to their released positions, the cover will move from the level position of FIG. 3 to the dashed line inclined position shown in the same FIG. in which the seal 52 at the rear of the vessel 12 is freed from sealing engagement with the wall surface 21 thereof, which permits fluids under pressure to escape rearwardly of the cabinet 16 under the guiding action of the splash shield 104. In the form shown, the cover at its rear end is biased upwardly by the springs 107 of U.S. Pat. No. 3,610,133 (see FIGS. 9 and 10 of that patent) acting on its hinge pin.

The cabinet 16 in the embodiment illustrated includes an operating panel surface 110 that includes a thermostat control knob 112 cooperating with an indicator ight 124 serving as a datum reference for knob 112. Knob 112 serves as a means of controlling the amount of heat supplied by the heater device 36 (see FIG. 2), which is in the form of three band type heating devices 114, 116 and 118 (which are each 2,000 watt devices in the illustrated embodiment) operably associated with the thermostat device of said U.S. Pat. No.

3,610,133 (see FIG. 12 thereof) at 120, the control knob 112 being appropriately calibrated for indicating the temperature that the cooking oil at the center of the vessel will be heated to by heater device 36 for any one position of the knob 112 over a suitable temperature range that is consistent with the heat supply requirements that are indicated hereinafter.

The panel 110 also includes two-way off-on switch device 122 controlled by suitable control knob 123 which is incorporaed together with the thermostat control in a suitable electrical system to connect all of the heating band devices 114, 116 and 118 to a suitable source of power in one position of switch 122 thereof (the "high" position), while shutting off the source of power in to all but one of the heating band devices in another position (the "low" position), and shutting off the source of power to all of the heater band devices in still another position (the "off" position). The bulb for the indicator light 124 is wired to light when the heater device 36 is electrically actuated in either the high or low positions of switch 122. The circuiting employed for heater device 36 is made such, in any suitable manner, that when control knob 123 is moved to the "high" position, the three heat band devices are energized, but are de-energized by the thermostat device operating a suitable switch (not shown) when the temperature of the fat at the center of the vessel reaches about 385° F.; the control knob 123 when positioned in the "low" position, on the other hand, insures that heater device 36 will initially warm up the fryer at a lower heat supplying rate (the power is reduced one-third) and keep it warm until use is intended.

Control knob 125 is part of a suitable timer off-on switch which actuates a suitable buzzer not shown at the end of the timing cycle set. Operating handle 30 for operating drain valve 26 also protrudes through the operating panel surface 110. The normal position for the operator to stand is in front of panel surface 110.

Cabinet 16 in the form shown is provided with a container 130 into which cooking oil from the vessel 12 is drained. As is made hereinafter clear, in accordance with this invention, the cooking oil is drained under pressure through the filter unit 42 that is more specifically described in application Ser. No. 824,430 (see FIG. 16 thereof), and to achieve this end, cabinet 16 is provided with an air compressor unit 132 of any suitable type that includes a suitable conduit 134 provided with an end fitting 136 of any suitable type adapted for securement to a fitting 138 applied to cover 50 through which air may be supplied under pressure to vessel 12 when the cooking oil is to be removed therefrom. Air compressor 132 is actuated by suitable operation off-on switch 139, conduit 141 leading to the motor of compressor unit 132.

METHOD OF INVENTION

In accordance with this invention, the vessel 12 and basket unit 38 are proportioned such that chicken, when divided into the customary cooking segments or serving pieces, is cooked in a suitable cooking oil or fat contained within chamber 22 in the ratio of 1 pound of chicken to about 2 pounds of cooking oil. In the specific embodiment illustrated, the vessel and basket unit are designed such that when the basket 12 is fully loaded, about 10 pounds of chicken will be cooked in about 21 pounds of cooking oil, with the vessel being about 60 per cent full when only the cooking oil is contained in same.

The chicken to be cooked in any one batch in accordance with this invention preferably comprises four two and one-quarter to two and one-half pound chickens each cut into nine pieces, with the breast being divided in half to form the ninth piece for each chicken. Of course, the chicken may be all breasts, or legs, etc., if so desired, but as different parts of the chicken are different in meat characteristics, it is preferred that the chicken for each batch consist of whole chickens cut up as indicated so that the sequence of putting the chicken in the fat that is hereinafter suggested can be followed so as to achieve the maximum benefits this invention contemplates. The chicken is prepared by the usual cutting and cleaning, and is suitably stored at refrigerating temperatures appropriate for chicken.

When cooking is to commence, the first batch of chicken to be cooked is given a dry coating by employing a suitable mixture of flour, spices, herbs, salt, and dried powdered eggs and milk, which is sprayed lightly with vegetable oil to add flavor and keep it from having a dusty consistency. The chicken is preferably taken directly from refrigeration without washing for breading purposes to avoid moistening of the breading. If the chicken must be washed immediately prior to application of the breading, it should be well drained before applying the breading.

To operate the fryer 10, the operator charges vessel 12 with cooking oil in the usual manner, drain handle 30 having been prepositioned (FIG. 1) to position the valve 26 in its closed position and filter device 42 being equipped with filter paper and disposed in its operating position of FIG. 2. Approximately 21 pounds of shortening should be employed, with the liquid level of the shortening when melted rising to the point where the basket handle 39 is attached to the basket (assuming the basket is positioned as shown in FIG. 2). While the cooking oil employed may be any suitable chicken frying medium, a suitable high smoke point all vegetable hydrgenated winterized shortening is preferred (the smoke point should be on the order of 465° F.). As used hereinafter and in the appended claims, the term "cooking oil" or "fat" means all frying mediums suitable for frying chicken, including those specifically referred to.

With the cover in its open position and the switch 122 is moved to its "low" position, and control knob 112 is moved to set it at the 250° F. position relative to the indicator light 124, which is the warm up position and energizes heater device 36 to supply sufficient heat to partially heat up the fryer and keep it warn until it is to be used.

When use of fryer 10 is desired, knob 112 is moved to its 400° F. position and knob 122 is set at the "high" position. The band heaters 114, 116, 118, which, as indicated in FIG. 3 are entirely without the internal surface 21 of vessel 12, and are disposed above the filter unit 42, all heat up and supply heat to the vessel 12 and through its wall 18 to heat up the oil until the temperature of the oil at the center of the vessel is approximately 385° F., whereupon the thermostat operates to shut off the heating device 36, as will be indicated by the turning off of indicator lamp 124. The arrangement is preferably such that there will be sufficient heat radiating and being conducted from heater device 36 so that the cooking oil will heat up to about 400° F.

The positioning of the heater device 36 adjacent the lower portion of vessel and about same establishes an annular convection current flow pattern in the heating oil that is indicated in FIG. 17 of said U.S. Pat. No. 3,610,133, wherein hotter cooking oil adjacent the surface 21 of vessel 12 raises upwardly and at the top of the vessel moves toward the center of same where it tends to move downwardly toward filter device 42 and then toward the vessel surface for reheating.

After the knobs 112 and 122 are set to preheat the cooking oil to 400° F., and assuming the filter unit 42 is in place, the basket 38 is applied empty to vessel 12, the basket being grasped by grasping its handle 39 and lowered into the vessel 12 (with its handle ends 41 retracted into the basket), to the position where its legs 40 rest on the bottom of the vessel 12.

When the light 124 goes off, the fryer is conditioned to receive the prepared chicken serving pieces, which should be dry breaded in the manner indicated and have a temperature of about 45 degrees F. The chicken pieces are dropped into the vessel in the following order: legs (or drumsticks), thighs, breast, and then wings. The immersed chicken is lifted gently from beneath (by employing a suitable hand tool) to separate the pieces and observe the color, while being careful to avoid breaking off the breading; with the cover remaining open, the chicken is browned until it has a color similar to that of cornflakes, as can be determined by visual observation; this takes about one to one and a half minutes. Then, the cover 50, with the swing arm device 98 of regulator 72 swung forwardly of the regulator to open valve 87, is swung to its initial closed position (approximately the broken line position of FIG. 3), wherein the cover 50 is sufficiently canted with respect to the vessel by the biasing action of springs 107 acting on the cover hinge pin 109, that the swing arm 56 of catch device 54 may be disposed under the catch plate 60 by swinging same downwardly to the catch device 54, and then pulling the front end of the cover downwardly as required to clear the front edge of plate 60, after which the swing arms 62 are swung upwardly to cam the cover 50 into the fully closed position that is shown in FIGS. 2 and 3.

The swing arm device 98 of regulator 72 is then swung to a vertical position to close valve 87 and complete sealing of the vessel 12, and the timer knob is turned to the "on" position, which starts the nine minute pressure cooking stage of the process. Water evaporating from the chicken builds the pressure within the vessel up to the desired 14 - 15 psig. level in approximately 1 minute after the valve 87 is closed, and when steam starts to exhaust from regulator 72 through valve 91 knob 122 is turned to the "off" position, thereby shutting off the power to heater device 36.

Thereafter, the pressure cooking of the chicken proceeds under the retained heat within the fryer, the moisture from the chicken parts maintaining steam pressure to keep the vessel in the desired pressurized condition, which is about 14 to 15 psig. As a result of the chicken and basket being put into the fryer, the temperature of the oil will quickly drop to about 300° F., and the heater device 36 will again be turned on by the thermostat about half way through the dropping of the chicken into the vessel 12. However, after the vessel is up to the indicated cooking pressure, and the heater device 36 is turned off, the residual heat in the heater device 36 and the vessel wall 21 is such that cooking proceeds through the pressure cooking stage without having to supply more heat. In practice, the temperature of the cooking oil drops down to about 250° F. during this cooking period. The heating oil convection flow pattern previously referred to continues, though substantially modified by the presence of the basket and chicken within vessel 12.

After the time interval has been set on the timer has elapsed, the buzzer operates, the sound of which alerts the operator that it is now time to open the cover 50. The swing arm 98 of the regulator is then operated (by swinging same toward or away from the operator) to move stem 78 of pressure rgulator 72 (by camming the forward set of cam surfaces 99 against cover surface 100) to release as much of the pressure as is reasonably practical from within the vessel whereupon the swing arms 62 of cam locks 63 are swung away from each other to release the sides of the cover; thereupon the biasing springs 107 of the hinge device 48 move the cover to its inclined partially opened position indicated in FIG. 3 to fully release excess pressure with vessel 12, whereupon the swing arm 56 of catch device 54 is pulled downwardly to clear the forward edge of plate 60 and is swung upwardly to release the front of the cover 50 for movement to the full open position. The handle 39 of basket 38 may then be grasped by the operator to lift the basket 38 upwardly sufficiently to dispose the retractable ends 41 of the handle 39 above the top of vessel 12, which permits them to spring outwardly, in accordance with the invention of said application Ser. No. 824,843, so that they can serve to temporarily hold the basket 38 on top of vessel 12, which permits the oil to drain from the basket and the chicken contained therein.

After draining for about 30 seconds, the basket 38 may be removed to remove the chicken therefrom for placement on a storage rack, bony side down, to eliminate grease pockets. The rack bearing the chicken may now be placed in a warming or holding oven at a temperature of 160° F., where it may be kept up to 4 - 6 hours without materially affecting the quality of the product.

For continuous batch cooking, a similar batch of chicken parts may then be breaded and applied to and cooked in the fryer 10 in the manner indicated without draining off the cooking fat, control knob 122 being turned to the "high" position by the operator (and the thermostat device that has been previously referred to automatically switching the heater device 36 into connection with its power source) to again preheat the cooking oil up to 400° F., as soon as the empty basket has been replaced in the fryer. This drives from the cooking oil the moisture remaining in same from the previous cooking operation so that the next batch of chicken can be dropped into the fat without boiling over, and also keeps the filter paper 302 of filter unit 42 sufficiently dry to permit the filtering procedure hereinafter described. The time required for the preheating to take place is about the same required to bread the batch of chicken (about 6 minutes) so that continuous processing of the chicken batches can proceed making continuous use of the fryer.

When immediate chicken requirements have been supplied, knob 122 is moved to the "low" position and knob 112 set up 250° F. to maintain the fryer at level of temperature suitable for ready return to full operation in the manner indicated. Movement of switch 122 to its "off" position shuts down the fryer.

The conditions of temperature, pressure and ratio of chicken and cooking oil weights employed in accordance with this invention have the effect of initially searing the chicken when it is first dropped into the vessel to restrict the amount of moisture the chicken loses and cooking oil absorbed as it is cooked and raise its surface temperature to approximately the boiling point of water which temperature level is approximately maintained throughout the cooking procedure, in accordance with this invention. Thus, the surface temperature of the chicken will be raised to about 212° F. during browning, but on closing of the vessel for pressure cooking, it will rise to about 250° F., still approximately the boiling point of water at the 14 – 15 psig. pressure range, and under the heating conditions indicated, remains the same until the end of the pressure cooking cycle. The temperature of the cooking oil, however, drops to about 340° F. on completion of the browning of the chicken and during the pressure cooking stage it gradually drops to 250° F., which is the desired temperature of the oil at the end of the nine minute cooking period, the heat retained by insulating the vessel and heating device being adequate for this purpose.

In practicing this method, the result is that the surface temperature of the chicken is kept about the boiling point of the moisture in the chicken, even under the pressure cooking conditions indicated, and thus no more heat than is necessary to adequately cook the chicken is supplied thereto during the cooking procedure, which results in a product of improved moisture characteristics. As a matter of fact, the dropping of the fat temperature to 250° F. at the end of the pressure cooking period insures that there will be no overcooking if the chicken is left in the fryer beyond the 9 minute period as the surface temperature of the chicken will then drop below the boiling point of the moisture in the chicken under the pressure conditions indicated.

The retained heat pressure cooking hereindescribed thus applies no more heat to the chicken than is necessary to keep its surface temperature at about the boiling point of water, which effects cooking with maximum flavor and moisture retention in the chicken. As spices and herbs are very water soluble, by keeping moisture loss from the chicken to a minimum, loss of spices and herbs will be correspondingly reduced. Moreover, the use of a dry breading coating on the chicken makes for a more consistent end product, eliminates the bacteria problem presented by moist coatings, and helps achieve a shortened browning time because of the browning agents, such as the powdered eggs and milk, included in the breading.

The resulting product has a shelf life of 4 to 6 hours, which means that those practicing this invention can work to the warmer rather than on a cook to order basis.

The arrangement of this invention is also such that a number of batches of chicken may be consecutively cooked in the same cooking oil without changing the cooking oil, and even when this is done, the oil is merely filtered and then returned to the vessel with sufficient make-up oil to restore the original volume to the chicken versus cooking oil ratio that has been previously indicated.

This end is achieved for a number of reasons, as for instance, the smooth contour of vessel wall 21 and the lack of any recesses or projections into the chamber 22 from same leave no places for solids to become lodged so that they will char, and the operation of the fryer is such that the cooking oil is not subject to high heat for any longer than necessary, which avoids premature break down of the oil. Furthermore, the convection flow pattern of the oil during the heat up period tends to move solids toward the cooler central portion of the oil charge so that they will tend to drop onto the filter device 42 and thus settle out of the hotter oil in which the cooking is done, whereby charring of solids is materially avoided. As experience has shown that for deep fat cooking from the standpoint of taste, appearance and digestibility the fatty acid content should be maintained in the 0.13 to 0.27 per cent by volume range, and charring of food solids is known to act as a catylist to significantly and rapidly increase the fatty acid content of cooking oils, the elimination of charring achieved by this invention is an important factor in permitting repeated use of the same cooking oil without adversely affecting the quality of the cooked product.

Experience has shown that ordinarily six batches can be safely cooked in the same cooking oil using the hereindisclosed invention, in terms of providing a high quality product that is free of digestive problems. After the six batches of chicken, or when the operator by inspection observes that the cooking oil should be filtered, the knob 122 is moved to the "off" position, the cover 50 is clamped in its fully closed position, valve 87 is closed, compressor 132 is connected to fitting 138 by applying fitting 136 thereto, switch 139 is actuated to turn on the compressor motor, and air under pressure is supplied to the sealed off vessel 12 up to the point where it starts escaping through regulator 72. The operator, after making sure that container 130 is in proper fat receiving position, operates handle 30 of linkage mechanism 28 to opening valve 26 (by moving same downwardly), which moves valve 26 to its open position, thereby permitting the pressure within vessel 12 to force the cooking oil therein through the filter unit 42 and out through port or drain opening 24 and into container 130. The filtering of the oil through filter unit 42 under the high pressure conditions indicated effects a drying of the solids collecting on top of the filter unit, which makes for ready and easy removal of same from the fryer after release of pressure from vessel 12 and opening cover 50, by applying the hooked end of a suitable implement to the handle 43 of the filter device to remove the filtered out solids and filter unit as a whole from the vessel 12.

The inside of vessel 12 should then be cleaned by taking a damp towel and starting at the lower portion of the vessel, wiping the vessel interior wall off moving upwardly. The steam resulting from the heat remaining in the vessel adjacent heater device 36 makes the towel act as a steam cleaner, and thus avoids having to use detergents or soap in the vessel (which can lead to suponification of the cooking oil).

A second filter unit equipped with the paper 302 is then positioned within the vessel 12, as shown in FIG. 3, whereupon the filtered cooking fat may be returned to the vessel and supplemented by new cooking fat up to the original volume indicated. The used filter unit 42, after it cools, is cleaned off and its paper replaced for reapplication to the fryer when the oil is next filtered. The cooking of the next six or so chicken batches may proceed in the manner previously indicated, whereupon the cooking oil is again filtered and replenished for cooking of a like number of chicken batches. This may proceed, using essentially the same cooking oil charge as replenished, until it becomes apparent from appearance that the cooking oil has reached the break down point that cannot be sufficiently diluted by the addition of make up shortening.

Where it is desired to provide crackings for gravy base, by practicing the filtering procedure just described after every third batch, the solids on the removed filter unit 42 will be a golden brown and just right for use as crackings.

It will thus be seen that this invention provides a deep fat fryer which not only provides a high quality product with cooking judgment reduced to a minimum, but also involves a safe, complication-free, and inexpensively manufactured cooker.

Furthermore, the invention provides a consistently high quality product at low cooking pressures and temperature with multiple use of the same cooking oil. One reason that multiple use of the cooking oil is permissible is that this invention avoids to a significant degree the two principal causes for cooking oil break down, namely hydrolysis (a reaction of fat with water) and oxidation (a reaction of fat with atmospheric oxygen). Thus, the preheating of the cooking oil to the 400° F. level removes the water from the fat after each batch is cooked, and the oil is kept shielded from the ambient air during filtering and has minimal exposure thereto on being returned to the vessel. Also, the filtering removes from the oil all but the finest of the solids collecting in same while a batch of chicken is being cooked, and a large portion of these "fines" can be retained in the container 130 for disposal by using care in pouring the oil back into vessel 12.

As indicated, the controls of the cooker are few and simple, and the operator is fully protected from being exposed to escaping fluids under pressure, which are directed rearwardly of the cooker and are from the normal station of the operator.

While the method and apparatus hereindescribed are arranged specifically to cook chicken, other meats and fish can be cooked with significant success utilizing this invention. If the oil is to be filtered after cooking a single batch of chicken, the oil preheating step should be effected before filtering to dry out the filter paper of unit 42; after three successive batches the fryer is warm enough so that filtering can be accomplished thereafter, or after any succeeding batch in that series without taking the preheating step to dry out the filter paper.

SPECIFIC DESCRIPTION

While the general arrangement that is illustrated in some detail has been found to provide highly satisfactory operation on a commercial basis, and thus is a preferred arrangement, the specifics involved may be varied within the usual ranges of competence of those working in the art to achieve the objectives of the invention. Although many of the details of the basic fryer arrangement may be as disclosed in said U.S. Pat. No. 3,610,133 sufficient specific description is included herein to make clear the nature of fryer 10.

VESSEL

As indicated, vessel 12 is of smooth walled construction and the heat supplying source is located exteriorly of cooking chamber 22. There are no protuberances, indentations, or ledges, etc. in the side wall of the vessel on which or in which solids could accumulate and char during the cooking process. This plus the tendency of the solids to settle out at the relatively cool location of the filter device, the periodic filtering of the cooking oil, and the adding of the make-up oil after filtering results in the fatty acid content of the cooking oil being kept within the desired range of between 0.13 and 0.27 per cent by volume for a substantial number of uses of the same cooking oil charge.

The vessel 12 may be made from any suitable material that is suitably formed as a one-piece construction to define the side wall 18 and the bottom wall 20 that defines opening 150 which has affixed thereto a sleeve 152 within which valve member 26 operates.

The vessel 12 at its upper end defines a curved rim 154 that is continuous about the circumference of the vessel and defines an inwardly converging cam surface 156 for insuring that the cover seal 52 is guided into effective sealing relation with the vessel internal wall surface 21.

HOUSING AND CABINET STRUCTURE

The housing structure 14 for vessel 12 as a matter of practice may be of any suitable type, that illustrated comprising a suitable base structure 160 supported by side panels 162 that are connected by bolts 164 to a top panel structure 166 that encompasses the upper end of the vessel and forms the top portion of the cabinet 16. The bolts 164 are received in anchor blocks 168 that pivotally mount the swing arms 62 of cam lock 63, as will be hereinafter described in detail. Top panel structure 166 defines a skirt 169, the portion of which that is at the front of the fryer defining panel surface 110. At the front and rear of the vessel 12, front and rear panels 167 and 167A are suitably applied, which, together with side panels 162, define the above referred to space 171 about the vessel in which the heater device 36 is mounted, which may also include suitable heat insulating materials.

The side wall structure 170 of the cabinet 16 may take any suitable form of construction to complete the cabinet 16, including a floor 172, a door 174 hinged to the side wall construction 170 by suitable piano type hinge 176, a rear wall 177, and suitable supporting wheels 178 or the like which in the form illustrated are caster wheels of any appropriate make. Side wall structure 170 encloses vessel housing structure 14 and, in use, the air space between the two serves to further heat insulate vessel 12.

The rim 154 of the vessel 12 is welded to the top panel structure continuously thereabout, whereby the space 171 about vessel is kept free of cooking oil leakage.

Top wall structure 166 is attached to the side wall structure 170 by appropriate screws 179.

VESSEL DRAIN VALVE ARRANGEMENT

Drain valve 26 comprises a stem portion 190 (FIG. 2) and a head portion 192 which is recessed as at 194 to receive a suitable O-ring seal element 196 that is in sealing relation with sleeve 152 of vessel 12 in the closed position of valve member 26.

The valve member stem portion 190 is coupled by pin 198 to operating lever 200 of operating linkage 28, which is suitably hinged where indicated at 202, as by receiving the end portion 204 of anchor member 206 that is suitably secured to the housing structure 14, with the lever member 200 being held in place by suitable screw device 208.

Also operably associated with the valve 26 is a tubular spout member 210 that is likewise coupled to lever member 200 by the pin 198 for movement therewith. Tubular spout 210 is proportioned to slidably engage and substantially complement the external surface 212 of the vessel sleeve 152. The tubular spout 210 thus moves vertically with the valve 26 as lever member 200 is operated, lever 200 being excised as at 213 to permit the consequent relative movement between spout 210 and lever 200.

The lever member 200 at its end 214 is received through an opening 216 in a lever member 218 pivotally connected to the housing 14 by suitable pin 220. Lever member 218 at its end 222 is pivotally connected by suitable pin 224 to actuating arm 226 to which operating handle 30 is connected by suitable pin 228.

Thus, when the operator pushes the handle 30 downwardly to the position of FIG. 1, the operating linkage 28 is operated to raise valve member 26 from the full line sealing position shown in FIG. 2 to the open or draining position of same, while upward movement of the handle 30 returns the valve member 26 to the full line sealing position of FIG. 2.

THE BASKET

The chicken receiving basket 38 comprises a generally cylindrical member 280 formed of open wire mesh to define an upstanding circular side wall 282 and a bottom wall 284 secured together in any suitable manner, as by welding or braising. The legs 40 are suitably secured, as by welding or brasing to the basket side wall 282 in the positions indicated in FIG. 3 and are preferably three in number.

The basket handle 39, and especially its end portions 41, serve the special purpose that has already been indicated by having the handle portion 41 retractable for full insertion of the basket 38 into the vessel, and extensible upon removal of the basket, as indicated in FIG. 11 of said U.S. Pat. No. 3,610,133, so that the basket can be rested temporarily at the top of the vessel to permit cooking oil to drain from the chicken back into the vessel. For this purpose, the handle 39 is in the form of a resiliently flexible wire element 290 shaped to define an open loop and having its end portions 292 reversed to define rectilinear slide portions 294 which are slidably received through conveniently located mesh openings 296 formed at opposite sides of the basket side wall 282.

The end portions 41 of the handle 39, when the basket is to be inserted in the vessel, can be pressed inwardly of the basket to the position shown in FIG. 2, where they will fit down inside the vessel 12, so that the vessel can be lowered to the position shown in FIG. 2.

On withdrawal of the basket from vessel 12, the end portions 41 of handle 39, under the biasing action provided by the resilient wire structure forming the handle 39, automatically shift outwardly so that the basket can be temporarily suspended in the manner indicated.

THE FILTER UNIT

The filter unit 42 has been described as generally comprising a filter plate 300 provided with the handle structure 43, a sheet of filter paper 302 of any appropriate type, and a protector plate 304.

As indicated in FIG. 2, the plate 300 at its mid portion has fingers or projections 46 struck downwardly to support the filter unit at the mid portion thereof, handle base plate 308 overlying the void created by the struck down portions 46.

Filter paper member 302 seats directly on top of the filter plate 300, the filter paper member 302 being formed with a suitable slot to receive handle 306.

The protector plate member 304 seats on top of filter paper 302 and is formed with the cross slots shown in said U.S. Pat. No. 3,610,133 that are proportioned to alternately receive the handle 306.

As is previously indicated, the filter unit 42 in use is disposed at the bottom of vessel 12 resting on its rim portion 44. The heating arrangement 36 is positioned so that the filter unit 42 will be disposed below the lowermost band type heater 118 and thus in a relatively cool area of the vessel.

The relationship of the filter unit to the heater device 36 is an important consideration due to the fact that as the cooking fat cools down during the cooking of a batch of chicken, water tends to condense in the area of filter and dampen the filter paper. Experience has shown that if the filter paper is wet at the time filtering is to take place, the paper will not filter satisfactorily as the pores close when wet. Consequently it is important that the filter unit 42 be located sufficiently close to the heater device 36 so that the heat of same will maintain the filter paper sufficiently dry to serve its filtering function without resulting in charring of the solids that collect on top of the filter unit. The relationship of parts shown in FIG. 2 satisfies these requirements, and in a commercial embodiment the upper surface of filter top plate 304 is about ¾ inch below the level of the lower edge of the lowest heating unit 118. If the filter unit were level with the lower edge of heating band 118, the solids would char, and if the filter unit were disposed lower than the preferred position indicated, the filter unit would not be sufficiently heated on fat preheating to dry the filter paper.

During the warm up period of the cooking operations, solids tend to deposit adjacent the mid portion of the filter unit 42 due to the aforementioned special convection flow established by the heating arrangement 36. This convection flow also directs freshly heated oil directly at the filter unit, which in turn deflects the descending heated oil at the mid portion of the vessel to the side wall of the vessel, so as to keep the temperature below the unit 42 relatively cool. The metal from which filter unit plates 300 and 304 are made absorbs the heat and rapidly distributes it by conduction over the filter paper to facilitate drying of same.

On discharge of the cooking oil in accordance with the prcedure heretofore described, the cooking oil is forced through the filter unit toward the port 42 and thus all of the solids in the cooking oil converge on and are caught by the filter unit 24 for ready removal by removing the filter unit in the manner already indicated.

THE COVER

The cover 50 is made from suitable heavy gauge metal having the general configuration indicated to define a dome-like cover portion 320, a pair of forwardly extending lugs 322, a pair of rearwardly extending lugs 324, and the flanges 70 on either side of the cover portion 320.

At its mid portion, the cover 50 is formed to define a platform 326 the upper surface of which is hardened and made planar to define surface 100 that the cam surfaces 99 of the pressure regulator 72 cooperate with for manual release of pressure bypassing regulator valve 91.

Fitting 138 to which the air compressor 132 is connected is suitably mounted in the platform 326 for communication through he cover to the space enclosed by same, fitting 138 being provided with a suitable check valve arrangement (not shown) to normally block off fluid pressure escape through same except when overcome by air flow from compressor 132.

THE COVER FRONT CATCH DEVICE

The cover front catch device 54 in the form shown comprises swing arm 56 in the form of a pair of arm members 330 pivoted to the cover lugs 322 by suitable bolt 332 secured in place by appropriate cap nut 334. A handle element 336 interposed between the arm members 330 serves as the spacer as well as an aid to moving the cover 50 between its full open and full closed positions.

The arm members 330 are secured together at thier outer ends by suitable bolt 338 secured in place by suitable cap nut 340, and have interposed between same handle 342 for conveniently manipulating the swing arm 56.

Arm members 330 are each formed with angled projections 344 each shaped to define a tooth 346 forming catch shoulders 58 that are shaped to swing under the catch plate 60 when the cover is in its partially opened, upwardly inclined position of FIG. 3.

The catch plate 60 comprises a suitable rigid element 348 formed to define along its lower edge 350 the downwardly inclined catch surface 352 that swing arm 56 cooperates with. Element 348 is affixed to the housing structure 14 in any suitable manner, as by employing screws 354.

It will be noted that the swing arm 56 of catch device 54 is biased by gravity to its locking relation with catch plate 60, although in the partially opened position of the cover under the biasing action of hinge 48, the swing arm 56 may be readily swung to its full open position.

The specifics of the lost motion hinge 48 for the cover are fully described in application Ser. No. 824,430 to which reference may be made.

THE COVER CAM LOCKS

The cam locks 63 each comprise a swing arm 62 hinged to the respective anchor block elements 168 by suitable pins 370 and provided with a suitable gripping handle 372 for ease in operating same.

The rollers 66 are the cam followers of the respective cam locks 63, and are journaled on suitable pins 370 suitably mounted in the respective swing arms 62. As already indicated, rollers 66 ride on cam surfaces 68 of the respective cover flanges 70, which surfaces 68 are formed to define a flattened seat 374 onto which the respective cam rollers 66 ride as swing arms 62 are moved to their vertical cover locking positions.

SPLASH SHIELD FOR COVER

Splash shield 104 comprises a sheet metal member 380 shaped to define a top 382, sides 384 and 386, and a front 388, with the rear being open as at 390 to define the discharge passage 108.

The shield 380 has its top 382 formed to seat on shoulder 392 of the cover platform 326 (see FIG. 3), and has its sides 384 and 386 slotted as at 394 and 396 (see FIGS. 1 and 2), respectively to receive the respective cover flanges 70. The front of the shield member 380 is slotted as at 398 to receive the cover front lugs 322, shield member 380 being secured in place by three sided yoke 106 secured to same (by employing appropriate screws 402) under the respective cover flanges 70 and lugs 322.

In the closed position of the cover, the lower edge 400 of the shield 104 is disposed below the upper rim 404 of housing structure 14, while at the rear of the fryer, the shield 104 is open across the entire rear of the cover.

It will therefore be seen that I have provided a method for cooking chicken that provides initial browning at a sufficiently high temperature to have a searing effect on the chicken, which reduces greasiness in the final product and undue moisture loss during cooking, and also maintains the heat intensity on the chicken at no more than what is necessary to adequately cook the chicken, this being done by holding the maximum temperatures and pressures, and volume and weight ratios employed relative to the cooking oil and chicken being handled insure the 250 degree F superheated cooking indicated without danger of overcooking. Furthermore, the reliance on retained heat cooking during the pressure cooking period insures that no more heat will be applied than needed.

The method and apparatus hereindisclosed for the first time makes it possible for untrained help to readily and safely cook to warmer requirements and provide a tasty product of high moisture content and four to six hours of shelf life.

The foregoing description and the drawings are given merely to explain and illustrate my invntion and the invention is not to be limited thereto, except insofar as the appended claims are so limited, since those skilled in the art who have my disclosure before them will be able to make modifications and variations therein without departing from the scope of the invention.

I claim:
1. A deep fat fryer comprising:
   a vessel defining a smoothed walled chamber proportioned to receive cooking oil and chicken serving pieces to be cooked in the approximate ratio of two to one,
   a drain opening at the bottom of said vessel,
   valve means for opening and closing said drain opening, a removable cover for closing off the top of said vessel, means for clamping said cover in closed relation to the vessel for cooking the chicken serving pieces under pressurized conditions, heater means about said vessel and spaced at a level above the level of the bottom of said vessel for heating cooking oil received in the chamber to a temperature range for cooking chicken serving pieces received in the oil when the oil is in the chamber, said heater means being exterior of said chamber, and filter means within said chamber and between the level of said heater means and the level of said vessel bottom for filtering cooking oil drained from said vessel before it passes through said valve means, and disposed to permit solids in the oil collect on its upper side, said filter means comprising a filter unit extending across said chamber and including filter paper through which the cooking oil is to pass on opening of said valve means to filter the cooking oil, and means for applying a differential pressure on the cooking oil when said valve means is opened for inducing cooking oil flow through said filter paper, said heater means being positioned in the spaced relation relative to said filter means to avoid charring of the solids collecting on the filter means when the oil is heated to said temperature range and yet drive off moisture from said paper to permit said filtering of the oil through said paper on opening of said valve means and application of the differential pressure to the cooking oil.

2. The fryer set forth in claim 1 wherein:

said filter unit further comprises a pair of upper and lower foraminous plates between which said filter paper is positioned, with said filter unit upper plate being disposed about three-fourths of an inch below the level of said heater means.

3. A deep fat fryer comprising:

a vessel defining a smoothed walled chamber proportioned to receive cooking oil and chicken serving pieces to be cooked in the approximate ratio of two to one, a drain opening at the bottom of said vessel, valve means for opening and closing said drain opening, a removable cover for closing off the top of said vessel, means for clamping said cover in closed relation to the vessel, heater means about said vessel and spaced above the bottom thereof for heating cooking oil received therein, said heater means being exterior of said chamber, and filter means between said heater means and said vessel bottom for filtering cooking oil drained from said vessel before it passes through said valve means, and disposed to permit solids in the oil collect on its upper side, said filter means including filter paper through which the cooking oil is to pass to filter same, said heater means being positioned relative to said filter means to avoid charring of the solids collecting on the filter means and yet drive off moisture from said paper to permit filtering through said paper, and means for supplying gas under pressure to said chamber for draining the oil from the vessel through said filter paper under fluid pressure conditions.

4. A deep fat fryer comprising:

a vessel defining a smoothed walled chamber proportioned to receive cooking oil and chicken serving pieces to be cooked in the approximate ratio of two to one, a drain opening at the bottom of said vessel, valve means for opening and closing said drain opening, a removable cover for closing off the top of said vessel, means for clamping said cover in closed relation to the vessel, vessel, heater means about said vessel and spaced above the bottom thereof for heating cooking oil received therein, said heater means being exterior of said chamber, and filter means between said heater means and said vessel bottom for filtering cooking oil drained from said vessel before it passes through said valve means, and disposed to permit solids in the oil collect on its upper side, said filter means including filter paper through which the cooking oil is to pass to filter same, said heater means being positioned relative to said filter means to avoid charring of the solids collecting on the filter means and yet drive off moisture from said paper to permit filtering through said paper, an large mesh wire basket means proportioned to substantially complement the internal horizontal cross sectional configuration of said chamber and adapted to receive the chicken to be cooked for immersion in the cooking oil, said basket means including retractable laterally extending projections that retract on insertion of said basket means in the chamber and extend on withdrawal of said basket means therefrom whereby said basket means may be temporarily rested on top of the vessel to permit excess oil to drain therefrom.

* * * * *